Jan. 13, 1925.

C. A. ALEXANDERSON 1,523,097

LABELING MACHINE

Filed Aug. 29, 1924

INVENTOR
Charles A. Alexanderson
BY Serrell + Son
his ATTORNEYS

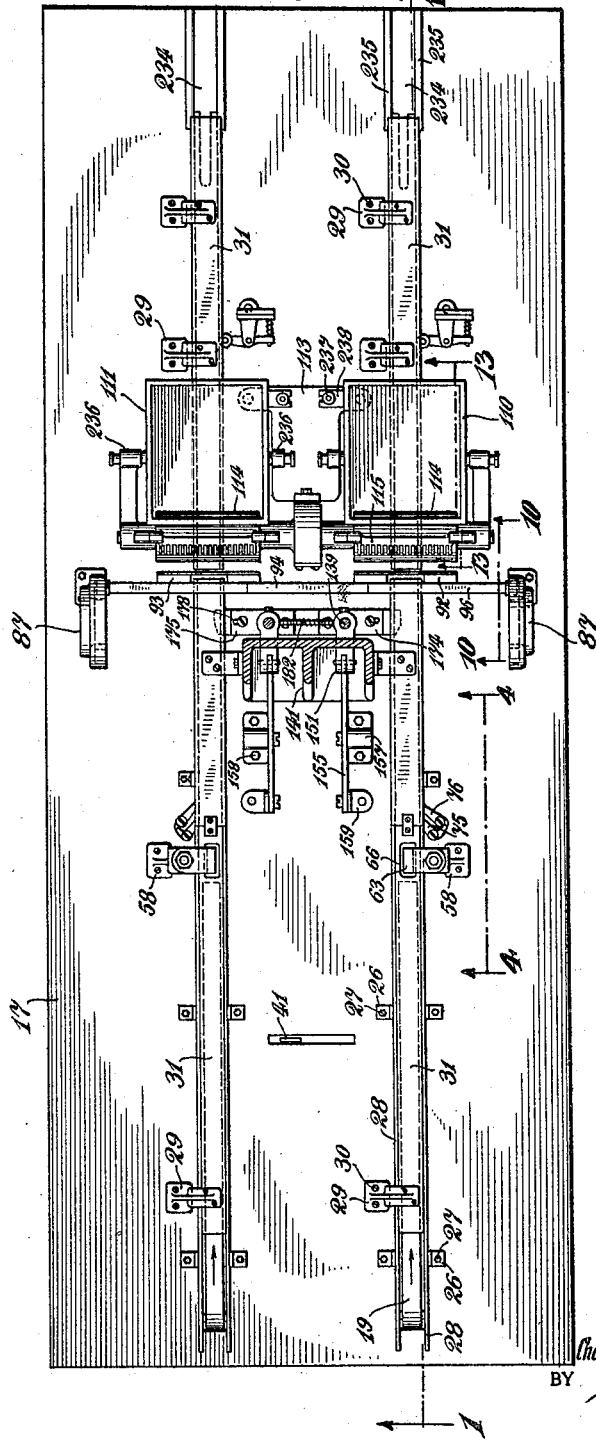

Jan. 13, 1925.  
C. A. ALEXANDERSON  
LABELING MACHINE  
Filed Aug. 29, 1924  
1,523,097  
7 Sheets-Sheet 4
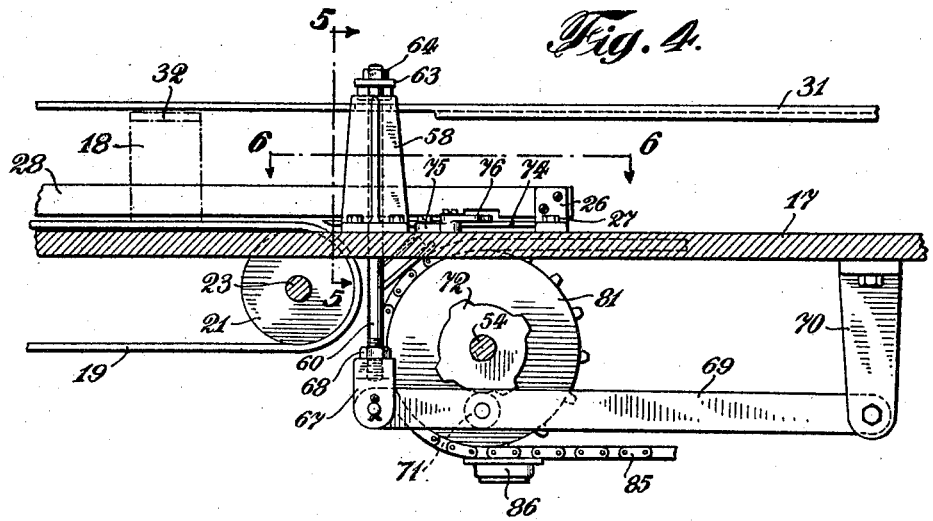
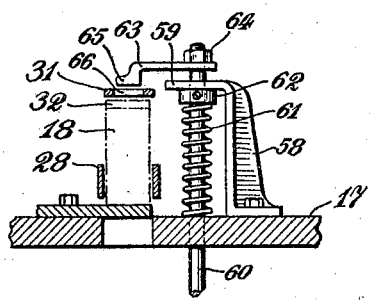
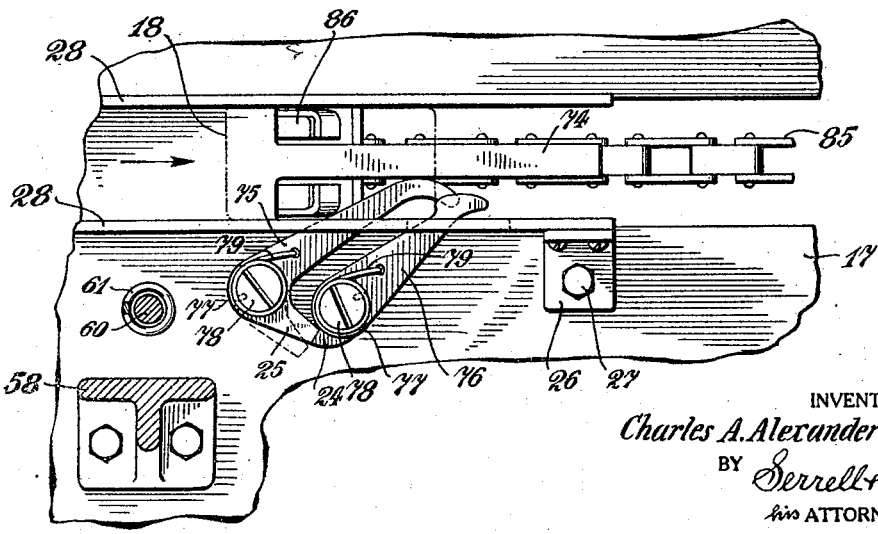
INVENTOR  
*Charles A. Alexanderson*  
BY *Serrell + Son*  
his ATTORNEYS

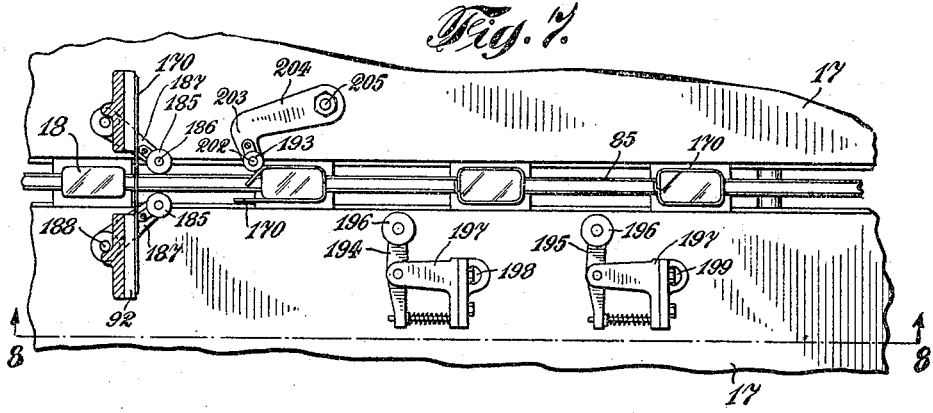
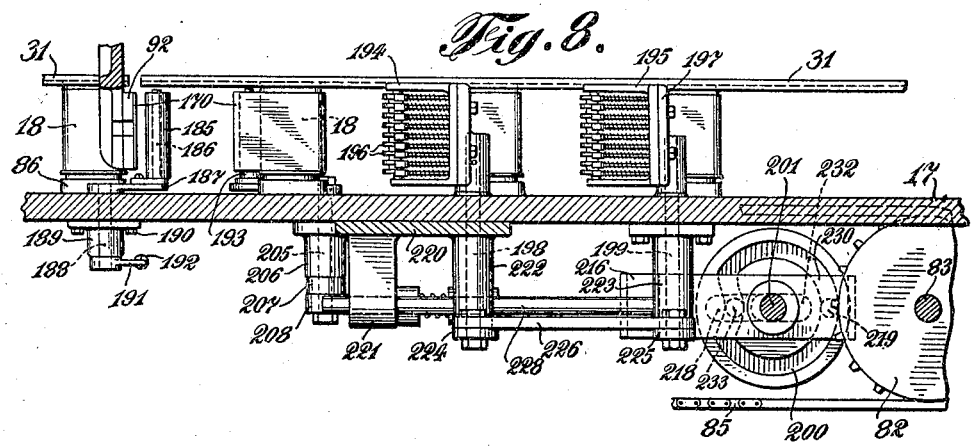
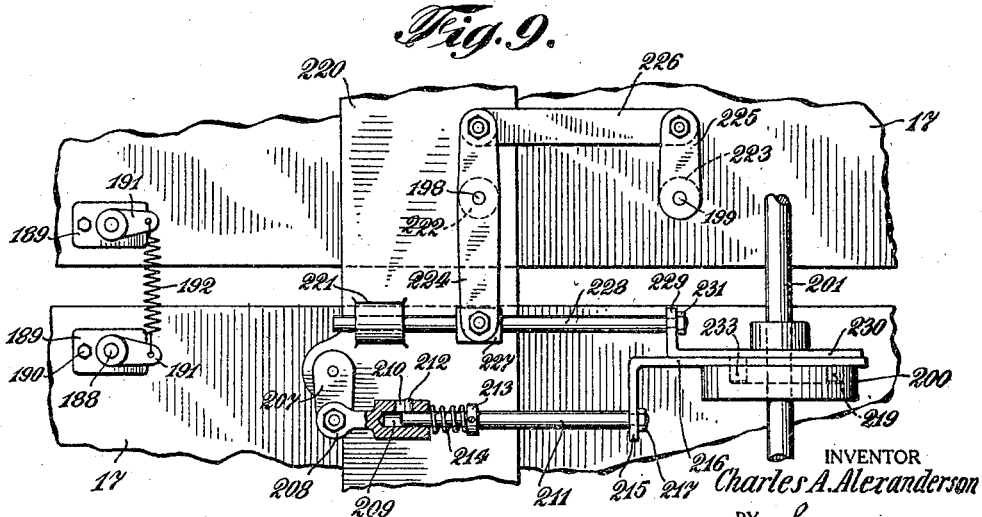

Jan. 13, 1925.   1,523,097
C. A. ALEXANDERSON
LABELING MACHINE
Filed Aug. 29, 1924   7 Sheets-Sheet 6
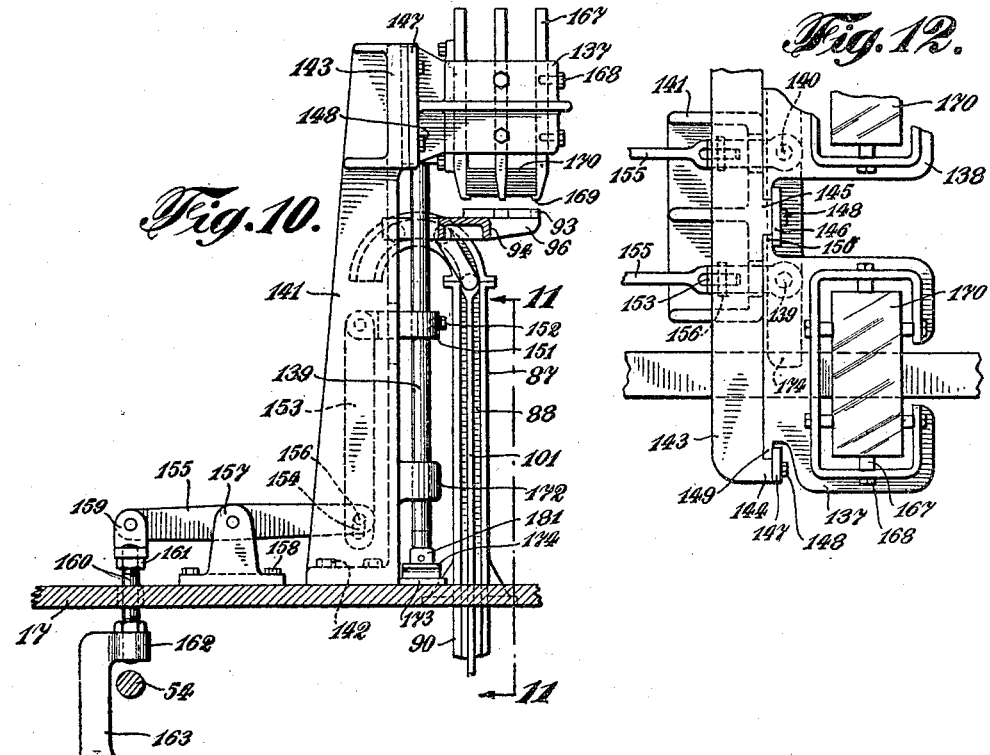
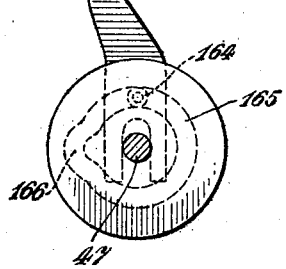
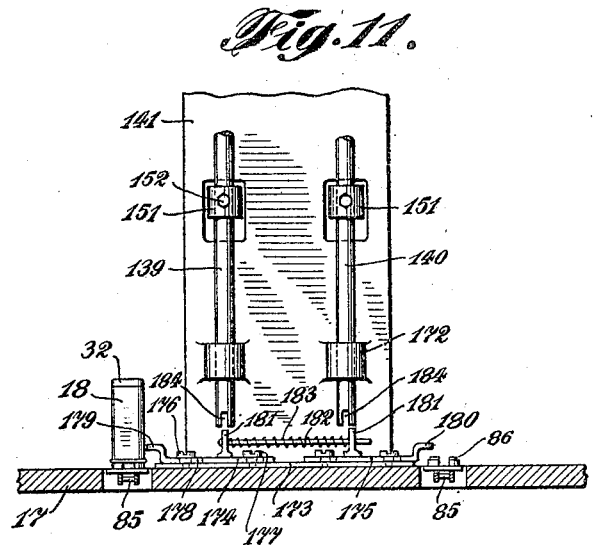
INVENTOR
Charles A. Alexanderson
BY Derrell + Son
his ATTORNEYS Jan. 13, 1925.                                                                                 1,523,097
C. A. ALEXANDERSON
LABELING MACHINE
Filed Aug. 29, 1924                              7 Sheets-Sheet 7
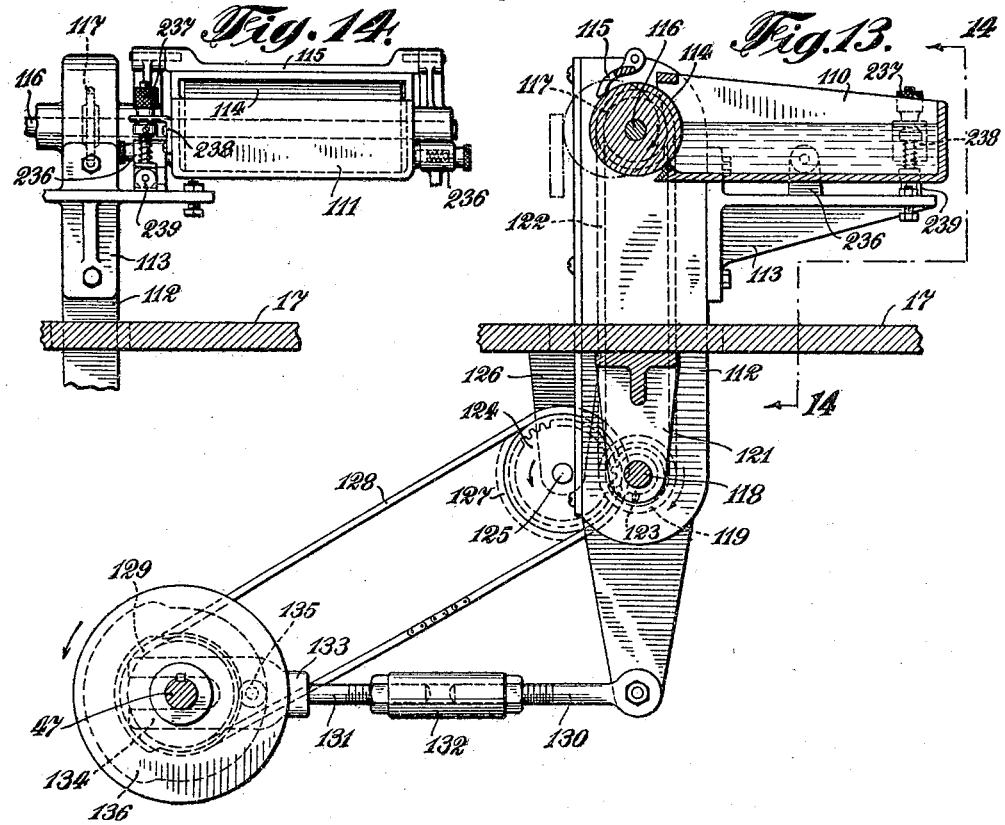
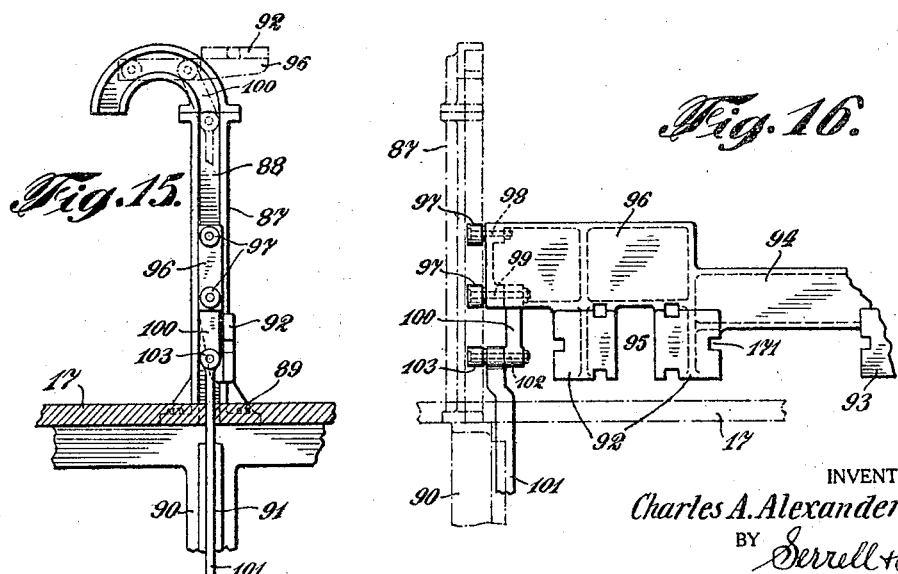
INVENTOR
Charles A. Alexanderson
BY Serrell + Son
his ATTORNEYS Patented Jan. 13, 1925.

1,523,097

UNITED STATES PATENT OFFICE.

CHARLES A. ALEXANDERSON, OF BROOKLYN, NEW YORK, ASSIGNOR TO EUGENE W. DURKEE, OF NEW YORK, N. Y.

LABELING MACHINE.

Application filed August 29, 1924. Serial No. 734,839.

*To all whom it may concern:*

Be it known that I, CHARLES A. ALEXANDERSON, a citizen of the United States, residing at the borough of Brooklyn, in the county of Kings, city and State of New York, have invented an Improvement in Labeling Machines, of which the following is a specification.

My invention relates to machines for attaching labels to cans or cartons, and is an improvement upon the machine invented by Eugene W. Durkee and myself and patented January 31, 1922, No. 1,405,190. As in the machine shown in said patent, my present machine is double acting, that is, the can feeding, label gluing and label applying mechanism are duplicated and driven by the same primary power and acting in unison, although either half of the machine may be made use of separately when desired. The present invention consists of the features and details of construction hereinafter described and claimed.

In the accompanying drawings:—

Fig. 3 is a top view in section on line 3—3 of Fig. 1.

Fig. 4 is a vertical section on line 4—4, of Fig. 3.

Fig. 5 is a vertical section on line 5—5 of Fig. 4.

Fig. 6 is a top view of Fig. 4 in section on line 6—6 of Fig. 4.

Fig. 7 is a top view of that portion of the machine containing the rollers or wipers for acting upon the labels after they have been received by the cans.

Fig. 8 is a side view of the same in section on the line 8—8 of Fig. 7.

Fig. 9 is a bottom view of the mechanism shown in Fig. 8.

Fig. 10 is a vertical view on line 10—10 of Fig. 3 partly in section.

Fig. 11 is a view on line 11—11 of Fig. 10, partly in section.

Fig. 12 is a top view of the label holders, one of which is partly broken away.

Fig. 13 is a view on line 13—13 of Fig. 3 showing the gluing mechanism partly in section.

Fig. 14 is a view on line 14—14 of Fig. 13.

Fig. 15 is a side elevation of the guide way for the label carrying plates, the bed of the machine being in section, and Fig. 16 is a view of the label carrying plates, one of them being broken away.

Similar reference characters denote like parts throughout the several views.

Figure 1:
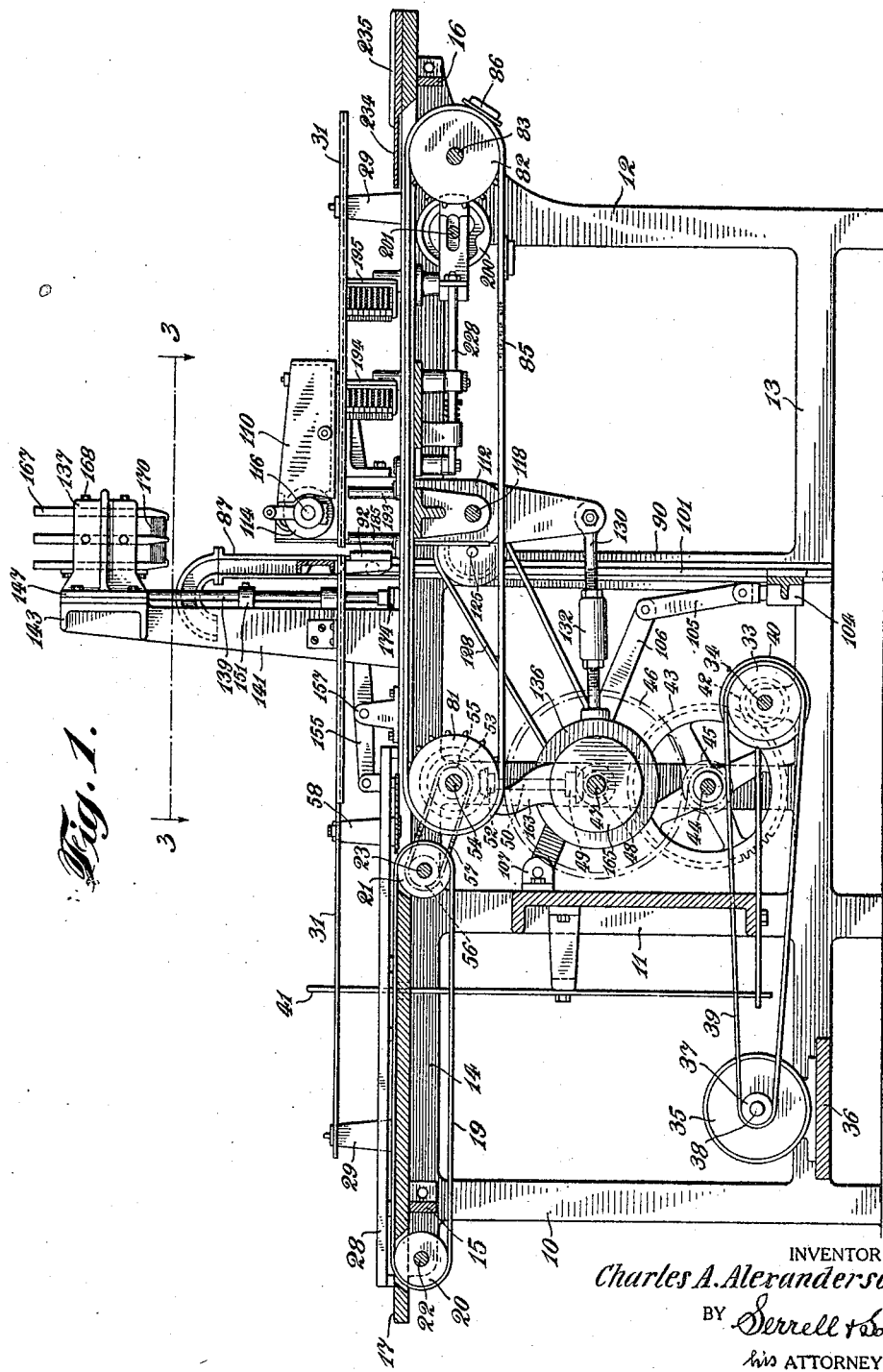
Figure 1 is a side elevation of my improved machine in section on the broken line 1—1 of Fig. 3.
Figure 2:
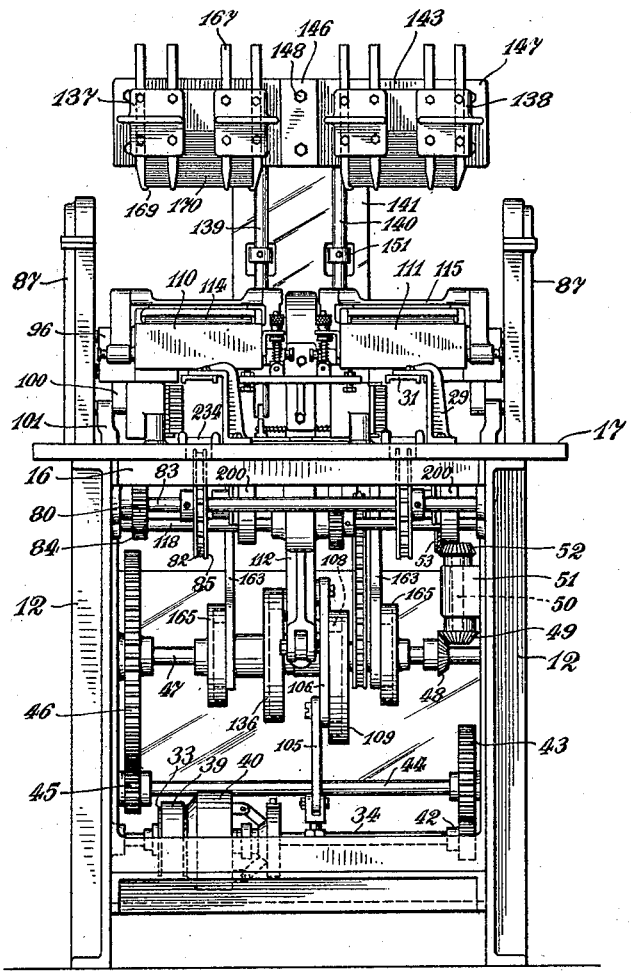
Fig. 2 is an elevation at the delivery end of the machine.

Referring to the drawings, the main frame of the machine consists of the uprights 10, 11 and 12, longitudinal cross pieces 13 and 14, and transverse pieces 15 and 16 which support the bed 17, and on which the various operative parts of the machine are secured or mounted.

The bed or table 17 is supported at such height as will admit of convenient access to an operator or operators standing on the floor.

The operator or operators, standing at the left hand end of the machine as shown in Fig. 1 places the cans 18 upon the endless belt or belts 19, which pass over rollers 20 and 21, mounted on the transverse shafts 22 and 23 journaled in bearings on the frame. The table or bed 17 is slotted for the passage of the belts 19.

At opposite sides of the belts 19 there are angle pieces 26 secured to the top of the bed 17 by bolts 27 or other suitable means, these angle pieces support vertical parallel strips 28 extending longitudinally of the bed on either side of the belts 19, forming side guides for the cans. Upright brackets 29 secured to the bed 17 by bolts 30 or other means, support the top guide strips 31, the longitudinal edges of which are bent downwardly at right angles.

These top strips are supported at a height slightly above the tops of the can covers 32, so that the cans when drawn along upon the belts 19, will pass thereunder without danger of contact with the forward ends of such strips.

33 denotes a drive pulley, fixed to the transverse shaft 34 journaled in suitable bearings on the frame.

This drive pulley may be operated by any suitable source of power. I have shown a motor 35 for this purpose, supported upon a bracket 36 fixed to the frame.

There is a pulley 37 fixed to the motor shaft 38, a drive belt 39 passing over the same and the drive pulley 33.

40 denotes a clutch for connecting the drive shaft, which clutch is operated by a hand lever 41.

Fixed to one end of the shaft 34 is a pinion 42, which engages a gear wheel 43 fixed on a transverse shaft 44 journaled in suitable bearings on the frame.

Upon the other end of the shaft 44 is fixed a pinion 45 which engages a gear wheel 46 fixed on one end of the main shaft 47 which is journaled in suitable bearings on the frame.

Fixed to the main shaft 47, adjacent its other end is a bevel gear 48, which engages a bevel gear 49 fixed on the lower end of a vertical shaft 50, supported in a bearing 51 upon the frame. Upon the upper end of this vertical shaft 50 is fixed another bevel gear 52, which meshes with a bevel gear 53 fixed upon a transverse shaft 54, upon which shaft is fixed a sprocket 55. A sprocket 56 is fixed upon the endless belt shaft 23, and an endless chain 57 passes over such sprockets 55 and 56 by which means the endless belts 19 are kept in motion.

Upon the bed 17 adjacent the inner edge of each of the endless belts 19 and at a predetermined distance from the forward ends of the top guide strips 31 is mounted an upright bracket 58 having a right angle arm 59 at the upper end provided with an opening in its center, through which extends in each bracket a vertical rod 60 screw threaded on both ends.

These vertical rods also pass through holes in the bed or table 17. A spiral spring 61 surrounds each of these rods between the top of the table and a collar 62 on the rods against which the tops of the springs bear, their lower ends bearing upon the top of the table or bed.

A horizontal arm 63 is secured to each of the vertical rods 60 adjacent their upper ends above the tops of the brackets 58, nuts 64 being screwed upon the upper ends of the rods and turned down upon the upper surface of said arms 63. Upon the free end of each of the arms 63 and integral therewith is a downwardly turned lug 65, which when the machine is in operation passes into and through slots 66 in the top strips 31, the lower ends of the rods 60 being screwed into threaded holes in the upper ends of knuckle joints 67 and secured by lock nuts 68, the lower ends of these joints being pivotally connected with one end of link bars 69, extending longitudinally of the machine, the other ends of such link bars being pivotally connected with the lower ends of brackets 70, secured to the under side of the bed 17 and depending therefrom. A roll 71 is pivotally connected to each of the bars 69 at a predetermined distance from that end connected with the joints 67. These rolls are periodically acted upon by cams 72, fixed to the transverse shaft 54 which is journaled in bearings upon the frame of the machine.

The object of this arrangement is to insure the covers 32 of the cans 18 being fully pressed down to place upon the tops of the cans as they pass under the top guide strips 31, the lugs 65 being given an up and down movement through the action of the cams 72, rolls 71 and springs 61, whereby the top of the cover of each can as it passes will be struck by the lugs 65 and pressed fully down upon the can, should it have accidentally been insufficiently placed previously.

The endless belts 19 deliver the cans upon horizontal plates 74, the sides of which are cut away at a predetermined distance from their forward ends leaving a space at each side of such plates for the passage of the can carriers hereafter described. At this point it is necessary to check the forward movement of the cans, in order that they may be so spaced that only one can at a time on each side of the machine will come into the position to receive a label.

For this purpose I provide on each side of the machine, two levers 75 and 76, each provided with a hub 77, through holes in which pass headed pivot pins 78, screw threaded on their lower ends and screwed into threaded holes in the bed. One end of a spring 79 is secured to each of the levers 75 and 76, the other ends of which are secured to the pivot pins 78.

Each hub 77 of the levers 75 has an integral short curved arm 25 which normally bears against a shoulder 24 on the lever 76 being held in such position by the springs 79. These levers extend diagonally of the bed and are spaced a predetermined distance from each other. The free ends of the levers 75 are curved towards the ends of the levers 76, and these levers 76 are provided with a concavity near their free ends on the side next to the levers 75, and are curved in the opposite direction on their extreme ends. The foremost can on each side of the machine comes into contact with the ends of the levers 76, and are checked in their movement by being caught in the recesses or concavities in such levers.

On each side of the machine, a sprocket wheel 81 is fixed to the transverse shaft 54, and another sprocket wheel 82 is fixed to a transverse shaft 83, journaled in bearings on the frame. A sprocket chain 85, passes over these two sprocket wheels.

Can carriers 86 provided with longitudinal recesses in their upper surfaces are secured to the sprocket chain 85 at uniform spaced distances. These carriers 86, are of a size and shape to fit into the recessed or depressed bottoms of the can 18, so that the cans are carried in regular spaced relation to each other thereby.

As the carriers 86 pass into the horizontal position at the top of the chain they contact with the levers 75 overcoming the tension of the springs connected with such levers forcing them backward a sufficient distance to draw the ends of the curved arms 25 on the hubs of such levers out of contact with the shoulders 24 on the levers 76. At this point the carriers 86, engage the bottoms of the cans held by the levers 76 and carry them forward easily overcoming the tension of the springs connected with such levers.

As the cans pass the ends of these levers, the springs 79 return the levers to their normal positions.

The upper portions of the carriers on each side of the recesses therein pass into and through the longitudinal spaces on each side of the plates 74.

At each side of the machine, and in alignment with each other there is a post 87, each channeled or provided with a longitudinal groove 88 in their facing sides. The upper ends of these posts are curved towards the feeding end of the machine and the posts are secured to the bed 17 by bolts 89 or in any other suitable manner.

These posts are directly above upright columns 90 forming a part of the frame of the machine and provided with a central longitudinal groove 91 extending the entire length of each column.

The bed 17 is also provided with an opening between the posts and these columns.

92 and 93 indicate label carriers of like construction on each side of the machine between the posts 87. They are in pairs, which are connected by a strip 94. There is a space 95 between each pair of a width slightly greater than the width of the cans, so that the cans may pass through such spaces when the carriers are in their lowermost position and directly in alignment with the respective rows of cans being fed forward.

These label carriers are integral with the plates 96, to one end of which there are secured rolls 97 by pivot pins 98 and 99 which rolls are within the channels or grooves in the posts 87. A link 100 is connected at one end to the plates 96 by the pivot pins 99, its other end being pivotally connected to connection rods 101 by pivot pins 102, which also connect rolls 103, operating in the channels or grooves in the posts 87. The connection rods 101 extend into the grooves 91 in the columns 90 and at their lower ends are connected to a cross bar 104 to which there are pivotally connected links 105, which links at their other ends are pivotally connected to one end of levers 106, the other ends of said levers being pivotally connected to fulcrum brackets 107 secured to the frame of the machine.

To one side of each of the levers 106 there is pivotally attached a roll 108 which are acted upon by the cam 109 secured to the main shaft 47. It will thus be seen that the label carriers 92 and 93, are given an up and down movement when the machine is in operation, and that at their extreme upward movement they are brought into a horizontal position in consequence of the rolls 97 passing into the curved portions of the grooves in the posts 87, as shown in Fig. 10 and in dotted lines, Fig. 15.

110 and 111 indicate two glue reservoirs, one on each side of the machine, supported by an upright 112 and a bracket 113, attached thereto. These reservoirs each have an open concave end adjacent the glue rollers 114, which openings the glue rollers cover.

Two combs 115 attached to the upright 112, bear against the glue rollers to prevent paper or any foreign matter being carried into the glue reservoirs. The glue rollers are mounted upon a shaft 116 journaled in the upright 112. Upon this shaft 116, there is fixed a sprocket 117.

The upright 112 extends through an opening in the bed 17, to a predetermined distance below it, and is loosely mounted upon a shaft 118.

A sprocket 119 is mounted upon the shaft 118, supported in brackets 121 depending from the bed 17, and a chain 122 passes over the sprockets 117 and 119. A gear wheel 123 is also mounted upon the shaft 118, which gear wheel meshes with a larger gear wheel 124, fixed upon a shaft 125, journaled in the brackets 126 fixed to the under side of the bed 17 and depending therefrom. A sprocket 127 is also fixed to the shaft 125, over which passes a chain 128, which also passes over a sprocket 129, fixed to the main shaft 47.

A rod 130, threaded at one end is pivotally connected at its other end to the lower end of the upright 112.

131 indicates another rod also threaded at one end. These rods 130 and 131 may be made in one piece, but I prefer to make them separately and connect them by a turn buckle 132 in order to permit adjustment as to length.

The other end of the rod 131 is connected to a head 133 of a forked member 134, which straddles the main shaft 47. A roll 135 is carried by the forked member 134, which roll is acted upon by the grooved cam 136 fixed to the main shaft. It will be seen that through these connections the glue rollers are continuously rotated during the running of the machine, and at regular intervals the upright carrying the glue reservoirs is rocked forward a predetermined distance carrying the glue rollers into the position indicated by dotted lines in Fig. 13, the movements of the parts being so timed that when the glue rollers are in such position, the label carriers 92 and 93 are in alignment therewith.

137 and 138 denote two label holders in horizontal alignment and secured to the upper ends of two vertical rods 139 and 140. 141 denotes an upright bracket secured to the bed 17 by bolts 142, or other suitable means. The lower portions of the rods 139 and 140 extend through openings in lugs 172, upon the bracket 141, which steady and guide such rods. At each end of the head 143 of the bracket 141 there is a right angle projection 144 and at its center a lug 145 to which is secured a plate 146, which extends on both sides of the lug a short distance leaving spaces between the said plate and the head 143 of the bracket. Similar plates 147 are secured upon the projections 144, by screws 148. The label holders are each provided at their rear with flanges 149 and 150, which fit into the spaces between the said plates and the head of the bracket, within which spaces the flanges are slidable so that the label holders are capable of an up and down movement guided by the said plates and bracket. The rods 139 and 140 pass through holes in one end of each of the arms 151, which are clamped to such rods in the desired position by binding screws 152. Vertical links 153 are pivotally connected at their upper ends to the other ends of the arms 151, the lower ends of said vertical links being provided with vertical slots 154. Horizontal links 155, are provided with pivot pins 156 at one end which pivot pins enter the slots 154 in the links 153, pivotally connecting said links.

At or near the center of each link 155, it is pivotally connected to the upper end of a bracket 157 secured to the bed 17, by screws 158, or other suitable means.

The other ends of these links 155 are pivotally connected to the upper ends of joints 159; rods 160 threaded at both ends and passing through openings in the bed are at their upper ends screwed into threaded openings in the bottoms of the joints 159, and secured therein by lock nuts 161. The lower ends of these rods 160, are similarly secured to the upper right angle ends 162 of cam forks 163, the lower ends of which are forked and straddle the main shaft 47. Rolls 164 are connected to the forks 163 which rolls act in grooved cams 165, fixed to the main shaft 47. During the operation of the machine the rolls 164 acting in the grooved cams 165, keep the label holders 137 and 138 in the raised position shown most clearly in Fig. 10 until such rolls enter the enlargements 166, in the cams 165, when the label holders will fall by gravity a predetermined distance. This occurs at the moment the label carriers 92 and 93 have reached their extreme upward movement, bringing the undermost label in each holder into contact with the glue coated surfaces of the label carriers, such labels adhering to the carriers 92 and 93 with sufficient tenacity to be drawn from the holders and remain upon the carriers when the label holders are raised, and the carriers are drawn down to meet the advancing cans.

A plurality of vertical rods 167 are spaced around each label holder, and secured thereto by screws 168, or in any suitable manner. The lower ends of these rods extend below the main body of the holders and are bent inwardly, forming fingers 169, upon which the labels 170 rest, being in superposed position.

The label carriers 92 and 93, are provided with slots 171, into which the fingers 169 on the label holders pass when the carriers and holders meet.

It is important that no labels be fed against the glued surfaces of the label carriers when no cans are being carried forward, and to accomplish this object, I secure to the bed 17, directly below the lower ends of the rods 139 and 140, a transverse strip 173 upon the upper surface of which are two plates 174 and 175, slidably held to the strip 173, by screws 176 and 177. Each of the plates 174 and 175 are provided with two slots 178 through which the screws 176 and 177 pass. The outer ends of each of the plates 174 and 175 are bent upward and then outward at right angles, as shown at 179 and 180 in Fig. 11. Upon the top of each plate there is an integral upright 181, each provided with a hole through which passes a horizontal pin 182, with a spiral spring 183, surrounding it between the two uprights, which spring tends to hold the plates 174 and 175, normally in their extreme outward position. The lower end of each of the rods 139 and 140, is provided with a vertical slot 184 of a size to receive the uprights 181 on the plates 174 and 175, when the label holders 137 and 138 are allowed to fall by gravity. The bent ends 179 and 180 of the plates 174 and 175 project slightly into the path of the cans which contact with such ends as they are carried along by the carriers 86, which contact pushes the plates 174 and 175 backward against the tension of the spring 183, bringing the uprights 181, in alignment with the slots 184, in the lower ends of the rods 139 and 140, allowing the label holders to fall into contact with the label carriers 92 and 93, which have at such moment reached their extreme upward movement and horizontal position.

When no cans are passing the bent ends of the plates 174 and 175, are held by the spring 183, in their extreme outward position which brings the uprights 181, out of alignment with the slots 184, in the rods 139 and 140, preventing the downward movement of the label holders, so that no labels can come into contact with the label carriers. This is illustrated most clearly in Fig. 11 where a can is shown passing on one side of the machine, and not on the other side.

The extreme downward movement of the label carriers 92 and 93 brings the spaces 95 between the respective pairs of glue coated plates in line with the rows of cans being carried forward by the can carriers 86, the forward ends of the advancing cans passing through such spaces against the centres of the labels adhering to the carriers, drawing such labels off of the carriers as the cans continue their forward movement.

As each can passes out through the spaces between the pairs of plates of the label carriers and carrying the label received by it while passing through such spaces, it is engaged on both sides by a pair of vertically disposed rollers 185, which rollers press the glue covered sides of the labels against the sides of the cans causing the labels to adhere thereto.

These rollers 185 are preferably of rubber, and are each loosely mounted upon a vertical spindle 186, fixed at their lower ends to the free ends of arms 187, the other ends of said arms being fixed to the tops of pivot pins 188, above the bed 17, such pivot pins passing through openings in the bed and through bearings 189, secured to the under side of the bed by screws or bolts 190, each pin 188 having fixed to its lower end another arm 191, to the free end of which is attached one end of a spiral spring 192. The tension of the spring 192 is sufficient to cause the rollers 185, to press the glue covered labels tightly against the sides of the cans as they pass between such rollers, and cause the labels to smoothly adhere to the sides of the cans. These rollers are best illustrated in Figs. 7, 8 and 9 of the drawings.

As the foremost can in each row or rows passes from between the rollers 185, it comes into contact with another roller 193, on the left hand side of the can which acts upon the glued end of the left hand side of the label and presses such end over and upon the rear end of the can and causes it to adhere thereto. The rollers 193 should be of such diameter that they will not come into contact with the glued surfaces of the end flaps on the right hand sides of the label while pressing the left hand flaps against the rear ends of the cans. There are two rollers 193, one for each row of cans. 194 and 195 denote two spaced wipers arranged on the right hand side of each row of cans, which wipers in turn act upon the other glue coated ends of the labels to fold them over the ends of the cans upon the previously folded ends and cause them to adhere thereto in a smooth and even manner.

The wipers 194 and 195 are preferably made in sections or a series of superposed flat rollers or disks 196 of rubber or other flexible material supported by brackets 197 which are mounted on and fixed to the vertical spindles 198 and 199, respectively, said spindles extending above the top of the bed 17 for connection with the brackets 197. These wipers 194 and 195 are similar to the wipers shown in the Patent No. 1,405,190 hereinbefore referred to and therefore do not require more detailed description.

The rollers 193 and the wipers 194 and 195, are operated through connections with grooved cams 200, fixed to a transverse shaft 201, driven by a gear 73, fixed to said shaft which meshes with a gear fixed on the shaft 83.

The rollers 193, are each mounted upon a spindle 202, fixed to the right angle end 203 of an arm 204 above the bed 17.

These arms are fastened to the upper ends of rods 205, which extend through holes in the bed and through bearings 206, beneath the bed, their lower ends being pivotally connected to links 207; the other ends of said links being pivotally connected to couplings 208, provided with a bore 209, and a slot 210, on one side extending into said bores. One end of rods 211, extend into such bores, and upon such ends are provided with pins 212, which extend into said slots 210.

Collars 213, are fixed to said rods 211 between which and the ends of the couplings 208, the rods are surrounded by spiral springs 214, the purpose of these springs being to prevent rigidity in the arms 204 and allow the rollers 193 to act upon cans of varying thickness without undue pressure.

The other ends of the rods 211, are threaded and pass through holes in the right angle ends 215, of vertical plates 216, and are secured thereto by lock nuts 217.

The plates 216 are each provided with a central longitudinal slot 218, through which passes the transverse shaft 201. A roll 219 is pivoted to one side of each plate 216, and extends into the grooved cams 200.

These connections operate the rollers 193, when the machine is running.

A transverse plate 220, is fixed to the underside of the bed 17, by bolts or other suitable means, from which depend integral brackets 221, each having a transverse bore adjacent its lower end.

The wiper spindles 198 and 199, extend through the bed 17 and plate 220, and through vertical bearings 222 and 223 depending therefrom, the lower ends of the spindles 198, being fixed to transverse links 224 and the ends of the spindles 199 being fixed to one end of shorter transverse links 225, the other ends of which are pivotally connected to one end of longitudinal links 226, which at their other ends are pivotally connected to one end of the links 224, the other ends of the links 224 being pivotally connected to collars 227 fixed to longitudinal rods 228, one end of each of which rods passes into and through the bores in the brackets 221. The other ends of the rods 228 are threaded and pass through holes in the right angle end 229, of vertical plates 230, and are secured thereto by nuts 231.

These plates 230, are each provided with a central longitudinal slot 232, through which passes the transverse shaft 201. A roll 233 is pivoted to one side of each plate 230, and extends into the grooved cam 200. These connections simultaneously operate the wipers 194 and 195 when the machine is running.

The action of the wipers 195 upon the cans completes the application of the labels thereto, and each can in turn passes from contact with such wipers with a label uniformly and smoothly applied to it.

The labeled cans continue their spaced travel until each in turn reaches the rear end of the sprocket chains 85, where the carriers 86 loose their hold upon the can bottoms, as the cans pass upon horizontal plates 234, upon which they are pushed along by the following cans, and pass into guideways 235, leading to any suitable table or receptacle from which they may be taken for packing.

The glue reservoirs 110 and 111, being pivotally supported upon the uprights 236 of the brackets 113, their level may be adjusted by the screws 237, which pass through angle pieces 238, fastened to the sides of the reservoirs, and pivotally connected with blocks 239 upon the brackets 113. This allows for adjustment of contact between the open ends of the reservoirs and the glue rollers 114.

The mechanism for feeding the cans, label holders, glue reservoirs, and means for operating the same, and the rollers and wipers for pressing the glued labels upon the cans, and means for operating the same are all duplicated, one complete set being provided on each side of the machine, and both sets may be operated simultaneously, or either set used separately when desired.

The arrangement and operation of the label holders permits the placing of labels into the holders even when the machine is running, and they are self feeding, which are features of great advantage over machines of this character heretofore made.

It will be readily understood that the machine may be easily adapted for applying labels to cans or cartons of various sizes and shapes without departing from the spirit of the invention.

I claim as my invention—

1. In a labeling machine, a can conveyer, means for operating the same, means for engaging the cans successively after they pass off said conveyer, and carrying them forward in spaced relation, a label carrier, means for imparting an up and down movement to the same, a glue roller, means for bringing it into contact with the label carrier in its upward movement, means for bringing the label carrier into a horizontal position as it reaches its extreme upward movement, a label holder, means for supporting the same above the label carrier, and means for causing such label holder to drop by gravity upon said label carrier at the time said carrier assumes a horizontal position.

2. In a labeling machine, a can conveyer, means for operating the same, means for checking the forward movement of the cans after they pass off said conveyer, means for releasing the checked cans and carrying them forward in spaced relation, a label carrier, means for imparting an up and down movement to the same, a glue roller, means for bringing it into contact with the label carrier in its upward movement, means for bringing the label carrier into a horizontal position as it reaches its extreme upward movement, a label holder, means for supporting the same above the label carrier, and means for causing such label holder to drop by gravity upon said label carrier at the time said carrier assumes a horizontal position.

3. In a labeling machine, a can conveyer, means for operating the same, means for pressing the cover upon each can as the cans pass from said conveyer, means for engaging the cans in rotation after they pass off said conveyer and carrying them forward in spaced relation, a label carrier, means for imparting an up and down movement to the same, a glue roller, means for bringing it into contact with the label carrier in its upward movement, means for bringing the label carrier into a horizontal position as it reaches its extreme upward movement, a label holder, means for supporting the same above the label carrier, and means for causing such label holder to drop by gravity upon said label carrier at the time said carrier assumes a horizontal position.

4. In a labeling machine, a can conveyer, means for operating the same, means for pressing the cover upon each can after the cans pass from said conveyer, means for checking the forward movement of the cans, means for releasing the checked cans and carrying them forward in spaced relation, a label carrier, means for imparting an up and down movement to the same, a glue roller, means for bringing it into contact with the label carrier in its upward movement, means for bringing the label carrier into a horizontal position as it reaches its extreme upward movement, a label holder, means for supporting the same above the label carrier, and means for causing such label holder to drop by gravity upon said label carrier at the time said carrier assumes a horizontal position.

5. In a labeling machine, a can conveyer, means for operating the same, means for engaging the cans successively after they pass off said conveyer and carrying them forward in spaced relation, a label carrier, means for imparting an up and down movement to the same, a glue roller, means for bringing it into contact with the label carrier in its upward movement, means for bringing the label carrier into a horizontal position as it reaches its extreme upward movement, a label holder fixed to the upper end of a vertical rod, means for holding said rod stationary, means operated by the cans for releasing such holding means and allowing a limited downward movement of such rod as the label holder drops by gravity, and means for lifting said rod and label holder.

6. In a labeling machine, a can conveyer, means for operating the same, means for checking the forward movement of the cans after they pass off said conveyer, means for releasing the checked cans and carrying them forward in spaced relation, a label carrier, means for imparting an up and down movement to the same, a glue roller, means for bringing it into contact with the label carrier in its upward movement, means for bringing the label carrier into a horizontal position as it reaches its extreme upward movement, a label holder fixed to the upper end of a vertical rod, means for holding said rod stationary, means operated by the cans for releasing such holding means and allowing a limited downward movement of such rod as the label holder drops by gravity, and means for lifting said rod and label holder.

7. In a labeling machine, a can conveyer, means for operating the same, means for pressing the cover upon each can as the cans pass from said conveyer, means for engaging the cans successively after they pass off said conveyer and carrying them forward in spaced relation, a label carrier, means for imparting an up and down movement to the same, a glue roller, means for bringing it into contact with the label carrier in its upward movement, means for bringing the label carrier into a horizontal position as it reaches its extreme upward movement, a label holder fixed to the upper end of a vertical rod, means for holding said rod stationary, means operated by the cans for releasing such holding means and allowing a limited downward movement of such rod as the label holder drops by gravity, and means for lifting said rod and label holder.

8. In a labeling machine, a can conveyer, means for operating the same, means for pressing the cover upon each can after the cans pass from said conveyer, means for checking the forward movement of the cans, means for releasing the checked cans and carrying them forward in spaced relation, a label carrier, means for imparting an up and down movement to the same, a glue roller, means for bringing it into contact with the label carrier in its upward movement, means for bringing the label carrier into a horizontal position as it reaches its extreme upward movement, a label holder fixed to the upper end of a vertical rod, means for holding said rod stationary, means operated by the cans for releasing such holding means and allowing a limited downward movement of such rod as the label holder drops by gravity, and means for lifting said rod and label holder.

9. In a machine for attaching labels to cans, an endless belt for conveying the cans a predetermined distance, means for rotating the belt, means for engaging the cans successively after they pass off said belt and carrying them forward in spaced relation, a post provided with a groove in one side its entire length and curved at its upper end, a label carrier in the form of a plate provided with an opening in its front, rolls pivotally connected to one side of said label carrier and operating within said groove in the post, means for raising and lowering said label carrier whereby it may be brought into a horizontal position as said rolls enter the curved upper end of said grooves in the post and into the path of the cans at the lowermost position of said carrier so that the cans will pass through the opening in the front portion of said carrier, a glue roller, means for bringing it into contact with the label carrier in its upward movement, a label holder, means for supporting the same above the label carrier, and means for allowing said label holder to drop by gravity upon said label carrier at the time said carrier reaches a horizontal position whereby the bottom label in the holder will be caused to adhere to the glue coated surface of the label carrier.

10. In a machine for attaching labels to cans, an endless belt for conveying the cans a predetermined distance, means for rotating the belt, means for checking the forward movement of the cans after they pass off such belt, means for releasing the checked cans and carrying them forward in spaced relation, a post provided with a groove in one side its entire length and curved at its upper end, a label carrier in the form of a plate with an opening in its front, rolls pivotally connected to one side of said label carrier and operating within said groove in the post, means for raising and lowering said label carrier whereby it may be brought into a horizontal position as said rolls enter the curved upper end of said groove in the post and into the path of the cans at the lowermost position of said carrier so that the cans will pass through the opening in the front portion of said carrier, a glue roller, means for bringing it into contact with the label carrier in its upward movement, a label holder, means for supporting the same above the label carrier, and means for allowing said holder to drop by gravity upon said label carrier at the time said carrier reaches a horizontal position whereby the bottom label in the holder will be caused to adhere to the glue coated surface of the label carrier.

11. In a machine for attaching labels to cans, an endless belt for conveying the cans a predetermined distance, means for rotating the belt, means for checking the forward movement of the cans after they pass off such belt, means for releasing the checked cans and carrying them forward in spaced relation, a post provided with a groove in one side its entire length and curved at its upper end, a label carrier in the form of a plate with an opening in its front, rolls pivotally connected to one side of said label carrier and operating within said groove in the post, means for raising and lowering said label carrier whereby it may be brought into a horizontal position as said rolls enter the curved upper end of said groove in the post and into the path of the cans at the lowermost position of said carrier so that the cans will pass through the opening in the front portion of said carrier, a glue roller, means for bringing it into contact with the label carrier in its upward movement, a label holder, means for supporting the same above the label carrier, means for allowing said holder to drop by gravity upon said label carrier at the time said carrier reaches a horizontal position whereby the bottom label in the holder will be caused to adhere to the glue coated surface of the label carrier, and means for wiping the labels upon the cans as they are advanced by their carrier.

12. In a machine for attaching labels to cans, the combination of a frame and bed supported thereby, an endless belt on each side of the machine for carrying the cans a predetermined distance, means for rotating each belt, means on each side of the machine for engaging the cans in rotation after they pass off said belts and for carrying them forward in spaced relation, a post on each side of the machine provided with a groove in their facing sides extending their entire length and having curved upper ends, a label carrier at each side of the machine in the form of plates provided with openings in their front portions, rolls pivotally connected to one side of each label carrier and operating within said grooves in the posts, means for raising and lowering said label carriers whereby they are brought into a horizontal position as said rolls enter the curved upper ends of the grooves in said posts, and into the path of the cans at the lowermost position of said carriers to allow the cans being conveyed to pass through the openings in the carriers, a glue roller on each side of the machine, means common to both for bringing them into contact with the label carriers in their upward movements, a label holder on each side of the machine, means for supporting the same above the label carriers, and means for causing such label holders to drop by gravity upon said label carriers at the time said carriers reach a horizontal position whereby the bottom label in each holder will be caused to adhere to the glue coated surfaces of the label carriers.

13. In a machine for attaching labels to cans, the combination of a frame and bed supported thereby, an endless belt on each side of the machine for carrying the cans a predetermined distance, means for rotating each belt, means for checking the forward movement of the cans after they pass off such belts, means for releasing the checked cans and carrying them forward in spaced relation, a post on each side of the machine provided with a groove in their facing sides extending their entire length and having curved upper ends, a label carrier at each side of the machine in the form of plates provided with an opening in their front portions, rolls pivotally connected to one side of each label carrier and operating within said grooves in the posts, means for raising and lowering said label carriers whereby they are brought into a horizontal position as said rollers enter the curved upper ends of the grooves in the posts and into the path of the cans at the lowermost position of said carriers to allow the cans as they are carried along to pass through the openings in the carriers, a glue roller on each side of the machine, means common to both for bringing them into contact with the label carriers in their upward movements, a label holder on each side of the machine, means for supporting the same above the label carriers, and means for causing such label holders to drop by gravity upon said label carriers at the time said carriers reach a horizontal position whereby the bottom label in each holder will be caused to adhere to the glue coated surfaces of the label carriers.

14. In a machine for attaching labels to cans, the combination of a frame and bed supported thereby, an endless belt on each side of the machine for carrying the cans a predetermined distance, means for rotating each belt, means for checking the forward movement of the cans after they pass off said belts, means for releasing the checked cans and carrying them forward in spaced relation, a post on each side of the machine provided with a groove in their facing sides extending their entire length and having curved upper ends, a label carrier at each side of the machine in the form of plates provided with an opening in their front portions, rolls pivotally connected to one side of each label carrier and operating within said grooves in the posts, means for raising and lowering said label carriers whereby they are brought into a horizontal position as said rolls enter the curved upper ends of the grooves in the posts, and into the path of the cans at the lowermost position of said carriers to allow the cans as they are carried along to pass through the openings in the carriers, a glue roller on each side of the machine, means common to both for bringing them into contact with the label carriers in their upward movements, a label holder on each side of the machine and fixed to the upper end of a vertical movable rod, means for holding said rods in raised position, means operated by the cans on both sides of the machine for releasing such holding means and allowing a limited downward movement of such rods as the label holders drop by gravity, and means on both sides of the machine for lifting said rods and label holders.

15. In a machine for attaching labels to cans, the combination of a frame and bed supported thereby, an endless belt for carrying the cans a predetermined distance, means for rotating same, means for checking the forward movement of the cans after they pass off said belt comprising two levers pivoted at one end of the bed with their free ends extending into the path of the cans, the hub of the first lever being provided with an arm normally bearing upon a shoulder on the hub of the second lever, a spring connected with each lever by which said levers are normally held in said position, a can carrier engaging the cans in rotation, which carrier contacts with the first lever pressing it out of the path of the cans, which action causes the arm of its hub to pass off the shoulder on the second lever whereby as the cans are advanced by said carrier they overcome the tension of the spring on the second lever throwing its end out of their path, a post provided with a groove in one side its entire length and curved at its upper end, a label carrier in the form of a plate provided with an opening in its front, rolls pivotally connected to one side of said label carrier and operating within said groove in the post, means for raising and lowering said label carrier whereby it will be brought into a horizontal position as said rolls enter the curved upper end of said groove in the posts and into the path of the cans at the lowermost position of said carrier so that the cans will pass through the opening in said carrier, a glue roller, means for bringing it into contact with the label carrier in its upward movement, a label holder, means for supporting the same above the label carrier, and means for allowing such holder to drop by gravity upon said label carrier at the time said carrier reaches a horizontal position, whereby the bottom label will be caused to adhere to the glue coated surface of the label carrier, and means for wiping the labels upon the cans as they are advanced by their carrier.

16. In a machine for attaching labels to cans, the combination of a frame and bed supported thereby, an endless belt on each side of the machine for carrying the cans a predetermined distance, means for rotating each belt, means on each side of the machine for checking the forward movement of the cans after they pass off said belts comprising two levers pivoted at one end to the bed with their free ends extending into the path of the cans, the hub of the first lever being provided with an arm normally bearing upon a shoulder on the hub of the second lever, a spring connected with each lever by which said levers are normally held in said position, a can carrier on each side of the machine engaging the cans in rotation, which carrier contacts with the said first lever pressing it out of the path of the cans, which action causes the arm on its hub to pass off the shoulder on the second lever whereby as the cans are advanced by said carrier they overcome the tension of the spring on the second lever forcing its end out of their path, a post on each side of the machine provided with a groove in their facing sides and having curved upper ends, a label carrier on each side of the machine in the form of plates provided with an opening in their front portions, rolls pivotally connected to one side of each label carrier and operating within said grooves in the posts, means for raising and lowering said label carriers whereby they are brought into a horizontal position as said rolls enter the curved upper ends of the grooves in said posts and into the path of the cans at the lowermost position of said carriers which allows the cans to pass through the openings in the carriers, a glue roller on each side of the machine, means common to both for bringing them into contact with the label carriers in their upward movement, a label holder on each side of the machine, means for supporting same above the label carriers and means for causing such label holders to drop by gravity upon said label carriers at the time said carriers reach a horizontal position whereby the bottom label in each holder will be caused to adhere to the glue coated surfaces of the label carriers.

Signed by me this 11th day of August, 1924.

CHAS. A. ALEXANDERSON.